United States Patent
Rose et al.

[11] Patent Number: 6,138,964
[45] Date of Patent: Oct. 31, 2000

[54] MATERIAL HANDLING UNIT WITH READILY-REMOVABLE BEARING ASSEMBLY

[75] Inventors: Albert W. Rose, Warren; Jesse Cwalina, Macomb Township, both of Mich.

[73] Assignee: E & E Engineering, Inc., Warren, Mich.

[21] Appl. No.: 09/281,598

[22] Filed: Mar. 30, 1999

Related U.S. Application Data

[63] Continuation of application No. 09/273,822, Mar. 22, 1999, abandoned.

[51] Int. Cl.[7] ........................................................ A47F 5/00
[52] U.S. Cl. ................................... 248/123.11; 248/125.1
[58] Field of Search ............................... 248/648, 122.1, 248/123.11, 123.2, 125.1, 286.1, 281.11, 280.11, 292.11, 284.1, 325, 564, 364

[56] References Cited

U.S. PATENT DOCUMENTS

| | | | |
|---|---|---|---|
| 3,765,676 | 10/1973 | Bearson | 273/1.5 R |
| 4,221,353 | 9/1980 | Kuhn | 248/292.1 |
| 5,746,404 | 5/1998 | Merko | 248/123.11 |
| 5,918,841 | 7/1999 | Sweere et al. | 248/123.11 |
| 5,992,809 | 11/1999 | Sweere et al. | 248/278.1 |

*Primary Examiner*—Ramon O. Ramirez
*Assistant Examiner*—Gwendolyn Baxter
*Attorney, Agent, or Firm*—Flynn, Thiel, Boutell & Tanis, P.C.

[57] ABSTRACT

A load balancing mechanism includes an inner support bracket, a load support bracket end a pair of parallel support arms which join the inner support bracket and the load support bracket together. The arms are supported by a load balancing cylinder arrangement which offsets the weight of loads supported on the load support bracket and permits the arms to be raised and lowered manually by a user even when the load is heavy. The opposite ends of the support arms are joined to the brackets by a pivot pin and a pair of bearing assemblies such that each connection between an end of an arm and a bracket is supported by two bearing assemblies at the opposite ends of the pivot pin. This arrangement permits removal and maintenance of one bearing assembly while the other bearing assembly remains in load-bearing engagement to support the load.

28 Claims, 6 Drawing Sheets

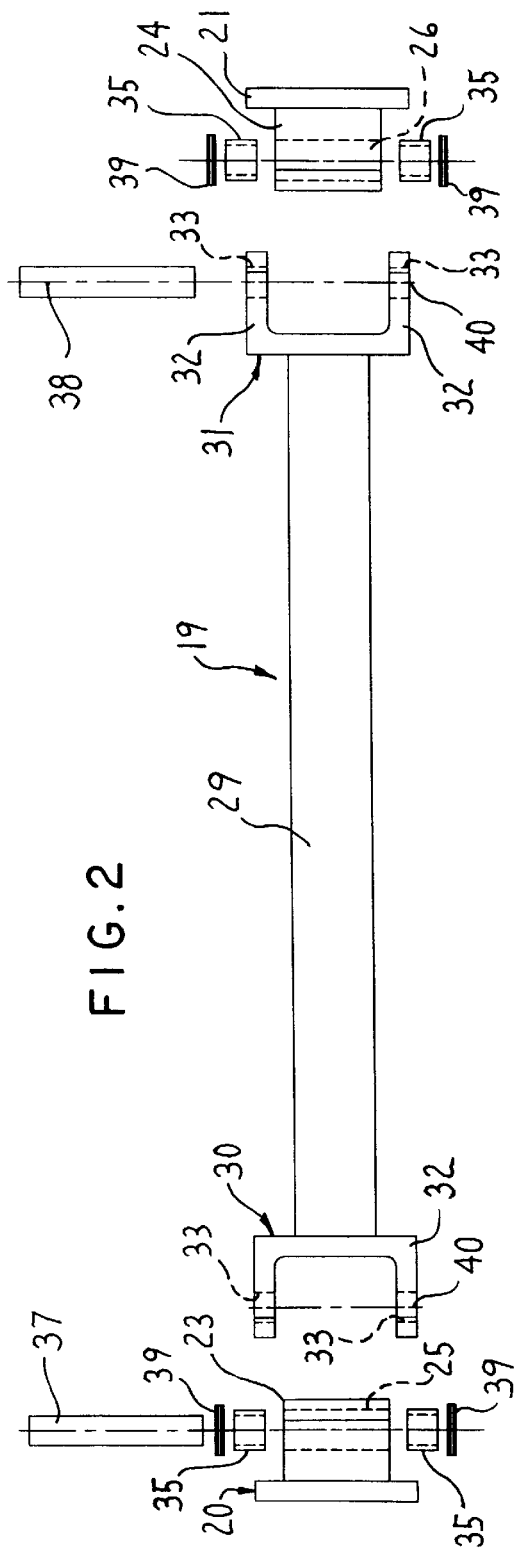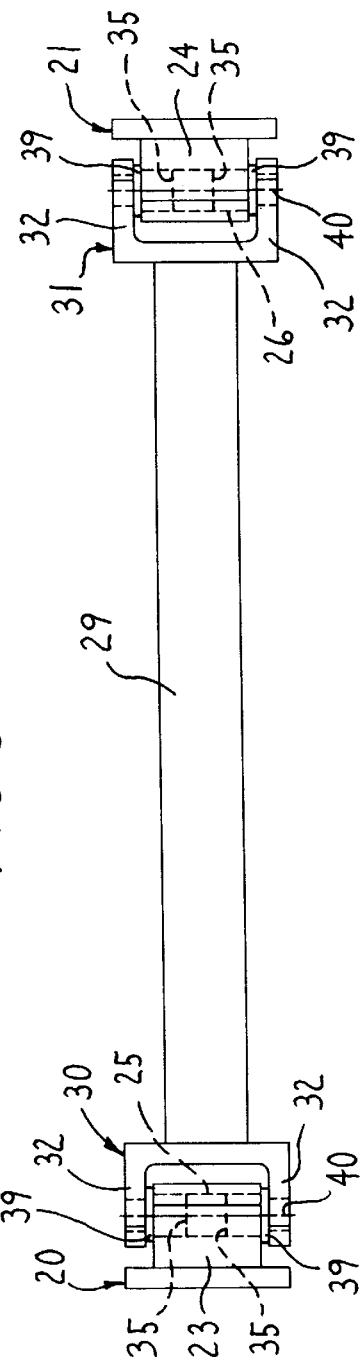

MATERIAL HANDLING UNIT WITH READILY-REMOVABLE BEARING ASSEMBLY

This application is a continuation of U.S. Ser. No. 09/273,822, filed Mar. 22, 1999, abandoned.

FIELD OF THE INVENTION

The invention relates to an arm arrangement having a load balancing mechanism for supporting loads and more particularly, to an improved bearing assembly for the arm arrangement.

BACKGROUND OF THE INVENTION

Load balancing mechanisms are used in industry, such as the automotive industry, to permit movement and manipulation of heavy loads with only a minimal amount of manual force being provided by an operator. The load balancing mechanism typically is part of a material handling unit that includes a movable arm arrangement connected thereto which extends outwardly from an upright support column and is able to support a heavy load, such as an automotive component, on the end thereof. The load balancing mechanism includes a pneumatic cylinder arrangement which vertically supports the weight of the load but permits manual raising and lowering and sideward swivelling of the arm by a user. Since the cylinder arrangement effectively balances the entire weight of the load, only a minimal amount of manual force is required for movement of the heavy loads. Such load balancing mechanisms are known and used in numerous applications and industries.

A load balancing mechanism generally is connected between a support column and an arm assembly. The arm assembly is pivotally connected at one end to the support column to permit upward and downward pivoting of the arm assembly, while the opposite end of the arm assembly supports a load, the weight of which is balanced by a load-balancing cylinder assembly.

FIGS. 2 and 3 illustrate one type of a conventional arm assembly 19 that includes an inner bracket which connects to a support column such as support column 12 in a known manner. An outer bracket 21 also is provided to support a load such as a tool and/or an article being supported by the tool. Each of the inner and outer brackets 20 and 21 are formed the same in that they both include rigid pin supports 23 and 24 which have horizontal bores 25 and 26 respectively which extend horizontally therethrough. Each pin support 23 and 24 includes a vertically spaced pair of the bores 25 or 26, respectively, such that the arm assembly 19 defines a parallelogram double-arm arrangement.

This arm assembly 19 further includes a pair of vertically spaced apart elongate support arms 29, the upper one of which is illustrated in FIGS. 2 and 3. The opposite ends of the support arm 29 include generally U-shaped support yokes 30 and 31. Each of the support yokes 30 and 31 includes a spaced apart pair of support flanges 32 which each have a bore 33 extending horizontally therethrough. Each support yoke thereby has a pair of bores 33 which are adapted to be coaxially aligned with the opposite open ends of a corresponding one of the bores 25 or the bores 26.

To pivotally connect the support yokes 30 and 31 to the inner and outer brackets 20 and 21, a pivot pin arrangement is provided. In particular, a hollow cylindrical sleeve bearing 35 is press fit into each opposite open end of the bores 25 and 26 and their respective pin supports 23 and 24. Each sleeve bearing 35 is mechanically press-fitted into the bores 25 and 26 so as to pivotally support pivot pins 37 and 38 therethrough. The pivot pins 37 and 38 are secured in place by a keeper. The pivot pins 37 also extend outwardly from the bores 25 and 26 and are rotatably received in a corresponding pair of bores 33, such that the support yokes 30 and 31 of each arm 19 is pivotally connected at its opposite ends to the inner and outer brackets 20 and 21 respectively. The support arms 19 therefore are movable vertically about horizontal pivot axes 40 defined by the pivot pins 37 and 38.

To maintain the support flanges 32 of the yokes 30 and 31 away from the opposing surfaces of the inner and outer brackets 20 and 21, additional thrust bearings 39 are provided in the spaces between the pin supports 23 and 24 and the flanges 32 of the yokes 30 and 31 as seen, for example, in FIG. 3.

While this arrangement provides suitable pivot connections between the inner and outer brackets 20 and 21 and the intermediate support arms 29, it is difficult to replace the sleeve bearings 33. In particular, to replace a worn sleeve bearing 33, it is necessary to unload the unit and remove tooling therefrom, disassemble the arm assembly 19, take the parts to a shop area, and then mechanically remove the sleeve bearings 33 from their respective bores 25 or 26 typically by a press. Often, this procedure requires use of heavy equipment such as a forklift or the like.

The inventive load balancing mechanism 10 of FIGS. 1 and 4–8 overcomes the disadvantages of the prior art arrangement of FIGS. 2 and 3. In particular, the load balancing mechanism of the invention includes a readily removable bearing arrangement which does not require disconnection of the individual arms of the arm assembly, or disconnection of the cylinder assembly from the arm assembly.

Preferably, each arm assembly includes a yoke at the opposite ends thereof. Each yoke includes a pair of support flanges disposed on opposite sides of the respective support brackets for the support column and the load. Pivot pins are provided to pivotally connect the opposite ends of the support arm to the inner and outer brackets respectively.

However, a separate independently removable bearing arrangement is provided between each end of the pivot pin and the support flange. More particularly, the bearing arrangement at one end of a pivot pin is removable separately and independently from the bearing arrangement at the opposite end of the pin such that one bearing arrangement can be disassembled, removed and replaced without requiring disconnection of the bearing assembly at the opposite end of the same pivot pin. Thus, the pivot pin continues to support the support arm as each bearing assembly is individually removed and replaced. The arm assembly therefore does not need to be disconnected from the cylinder assembly or the support column as the bearing assemblies are changed. This greatly minimizes the time and difficulty in replacing worn bearings.

Other objects and purposes of the invention, and variations thereof, will be apparent upon reading the following specification and inspecting the accompanying drawings.

BRIEF DESCRIPTION OF THE DRAWINGS

FIG. 2 is an exploded plan view of an arm assembly of a conventional load bearing mechanism.

FIG. 3 is a plan view of the conventional arm assembly.

Figure 1:
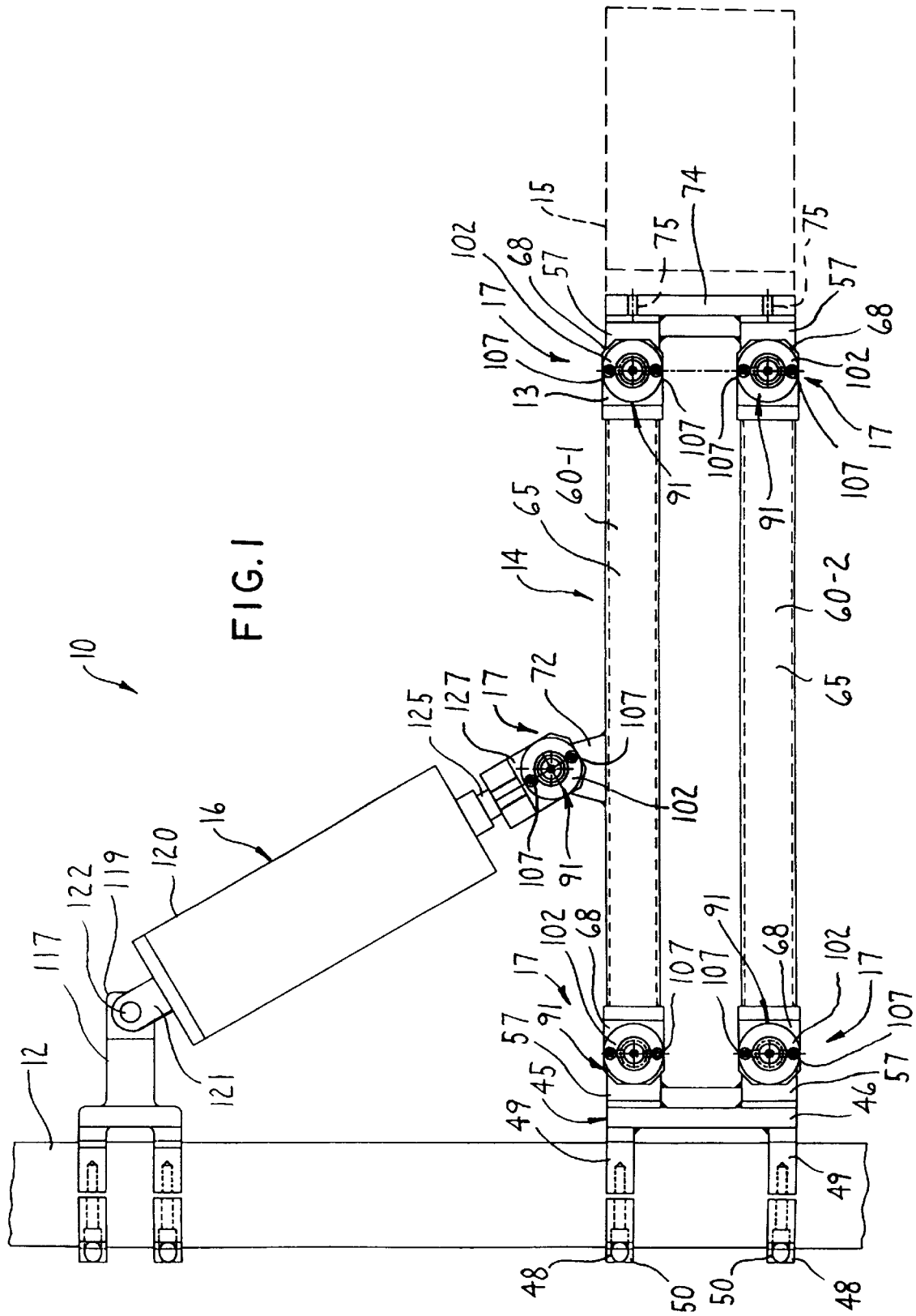
FIG. 1 is a side elevational view of a load bearing mechanism of the invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a material handling device includes a load balancing mechanism 10 which is mounted to a support column 12, and an arm assembly 14 which is pivotally connected to the support column 12 such that the arm assembly 14 is movable upwardly and downwardly. An outer end 13 of the arm assembly 14 supports a load 15, the weight of which is balanced by a load-balancing cylinder assembly 16.

Generally, the arm assembly 14 is pivotally connected to the support column 12 at one end thereof and to the load 15 at the opposite end by pivot connections 17. The cylinder assembly 16 is similarly connected at least to the arm assembly 14 by pivot connections 17. As discussed in further detail herein, these pivot connections 17 can be readily repaired and replaced without requiring disassembly of the entire mechanism 10.

More particularly, the support column 12 is vertically elongate and supported at its upper or lower ends in a conventional manner. The support column 12 is able to support heavy loads being applied to it by the load balancing mechanism 10 which is mounted thereto. The support column 12 is a conventional component and further discussion thereof is not believed necessary.

Figure 4:
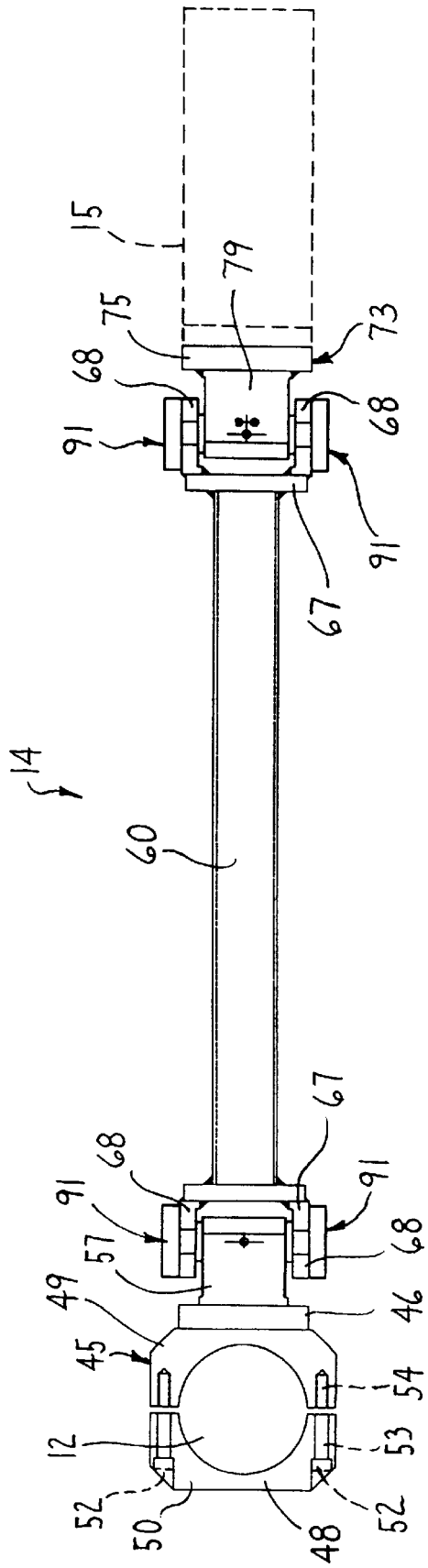
FIG. 4 is a plan view of the inventive load bearing mechanism of FIG. 1.
Figure 5:
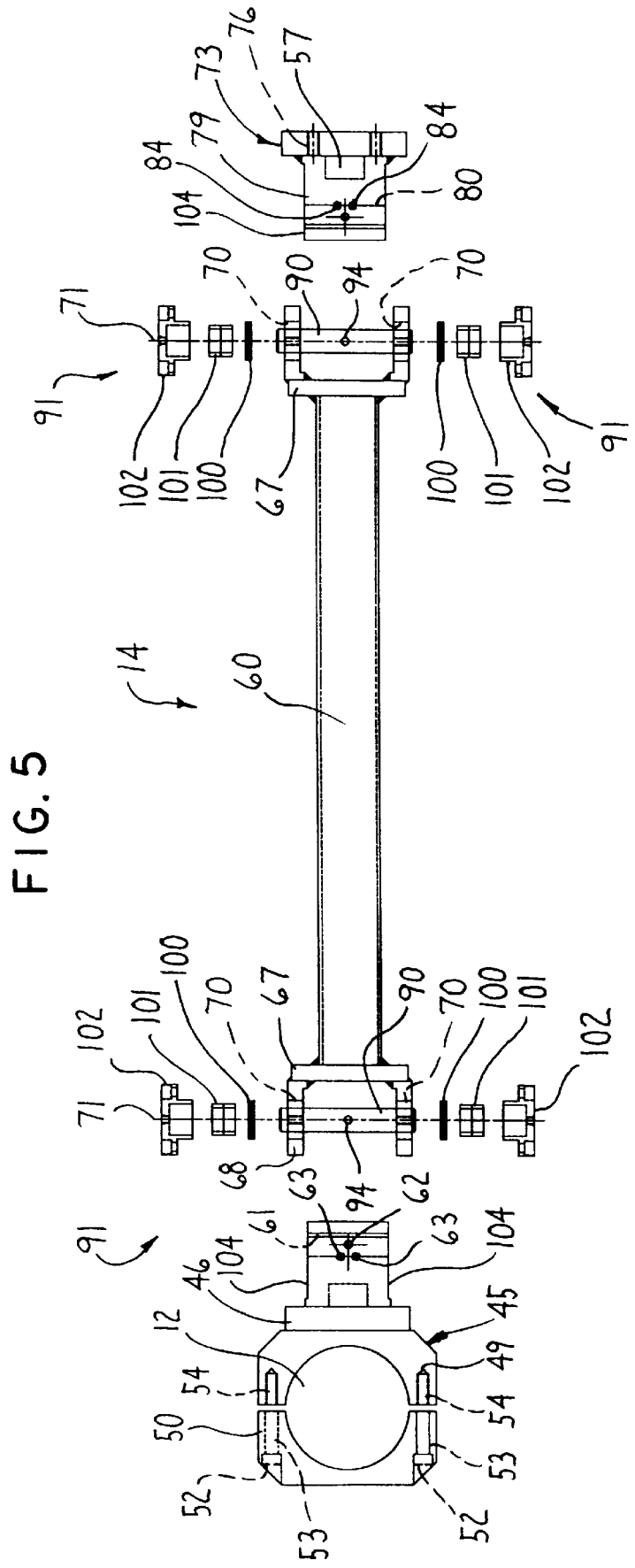
FIG. 5 is an exploded plan view of the load bearing mechanism FIG. 4.

Referring to FIGS. 1, 4 and 5, the load balancing mechanism 10 is securely connected to the support column 12 by an inner support bracket 45 which clamps onto the support column 12. In particular, the support bracket 45 includes a rigid bracket plate 46 which is vertically enlarged and faces towards the outer circumferential surface of the support column 12. The bracket plate 46 includes a pair of vertically spaced-apart clamps 48 which clamp to the support column 12. Each of the clamps 48 includes a fixed jaw 49 and a removable jaw 50.

The fixed jaws 49 are formed integral with the bracket plate 46 and project rearwardly therefrom into mating engagement with one side of the support column 12. Each fixed jaw 49 is generally U-shaped and opens rearwardly.

The removable jaws 50 have a similar U-shape which opens forwardly toward the fixed jaw 49 such that the support column 12 is secured between each fixed jaw 49 and the removable jaw 50 which corresponds thereto. The opposing fixed jaw 49 and removable jaw 50 are fixedly secured together by fasteners 52 which are inserted axially through bores 53 in the removable jaw 50 and into corresponding bores 54 in the fixed jaw 49. The opposing jaws 49 and 50 thereby are secured together and in effect, clamp onto the support column 12. This clamping arrangement is conventional and permits adjustment of the height of the load balancing mechanism 10 by mounting the load balancing mechanism 10 to the support column 12 at a desired elevation.

The inner support bracket 45 also includes a pair of pivot supports 57 which are vertically spaced apart and adapted to support the arm assembly 19. In particular, each pivot support 57 projects forwardly from the bracket plate 46 and is adapted to support one of the individual arms 60 of the arm assembly 14.

The pivot support 57 has a substantial thickness in the vertical direction wherein a bore 61 extends horizontally therethrough. Each bore 61 includes opposite open ends which open horizontally from the pivot supports 57. Each pivot support 57 also includes a locking bore 62 which opens vertically through the horizontal bore 61, and screw holes 63 which are blind bores that extend vertically into the solid material of the pivot support 57.

The arm assembly 14 generally is connected to the support column 12 by the inner support bracket 45 and in particular, includes an upper arm 60-1 and a lower arm 60-2 which are supported respectively on the upper and lower pivot supports 57. The arms 60-1 and 60-2 extend generally horizontally away from the support column 12 and are oriented parallel to each other. Since the arms 60-1 and 60-2 are pivotally connected to the upper and lower pivot supports 57 as discussed in greater detail hereinafter, the arms 60-1 and 60-2 effectively move in unison while being maintained in parallel relation. The skilled artisan will appreciate that while the illustrated embodiment of the load balancing mechanism 10 is a double-arm arrangement, a single-arm arrangement also may be used wherein a single arm is supported by a load balancing mechanism such as the load balancing mechanism 10.

With respect to the individual arms 60 of the arm assembly 14, each arm 60 is formed from an axially elongate arm section 65 and a support yoke or bracket 67 at each of the opposite ends of the arm section 65. Each yoke 67 generally has a U-shape which is defined by a pair of sidewardly spaced apart support flanges 68. The support flanges 68 of each yoke 67 extend generally axially relative to the arm section 65 and are parallel to one another.

Each support flange 68 also includes a bore 70 which extends horizontally therethrough wherein the bores 70 of each spaced apart pair of support flanges 68 are axially aligned relative to a central axis 71 as generally illustrated in FIG. 5. Each of the flange bores 70 has a diameter which is greater than the diameter of the bore 61 defined in the pivot support 57.

The upper arm 60-1 also includes a cylinder connector flange 72 on an upper side thereof. The cylinder connector flange 72 projects generally vertically from the upper side of the arm section 65 for connection to the pressure cylinder assembly 16.

As generally illustrated in FIGS. 1, 4 and 5, the inner yoke 67 on the inner end of each arm 60 is pivotally supported on the inner support bracket 45 that is connected to the support column 12, while the outer yoke 67 itself is connected to a load support bracket 73.

The load support bracket 73 is adapted to support a load 15 such as a load-gripping or supporting tool and any materials being supported thereby. Since the inner and outer yokes 67 at the opposite ends of each arm section 65 are identical and the connection of these yokes 67 to the inner support bracket 45 and the load support bracket 73 also are the same, the following description of the pivot connections 17 which are defined between these components will primarily be directed to the load support bracket 73.

More particularly with respect to the load support bracket 73 (FIGS. 4, 5 and 6), the load support bracket 73 includes a bracket plate 75 which is vertically enlarged. The bracket plate 75 includes a plurality of horizontal bores 76 which extend longitudinally therethrough such that the load 15 is securely fastened to the bracket plate 75 by suitable fasteners such as screws, bolts or the like. It will be understood that the load 15 as used herein references the weight of an end-of-arm tool and any material loads being supported thereby. The actual material load typically will vary depending upon the article being manipulated. An example of such an article is an automotive component.

Figure 6:
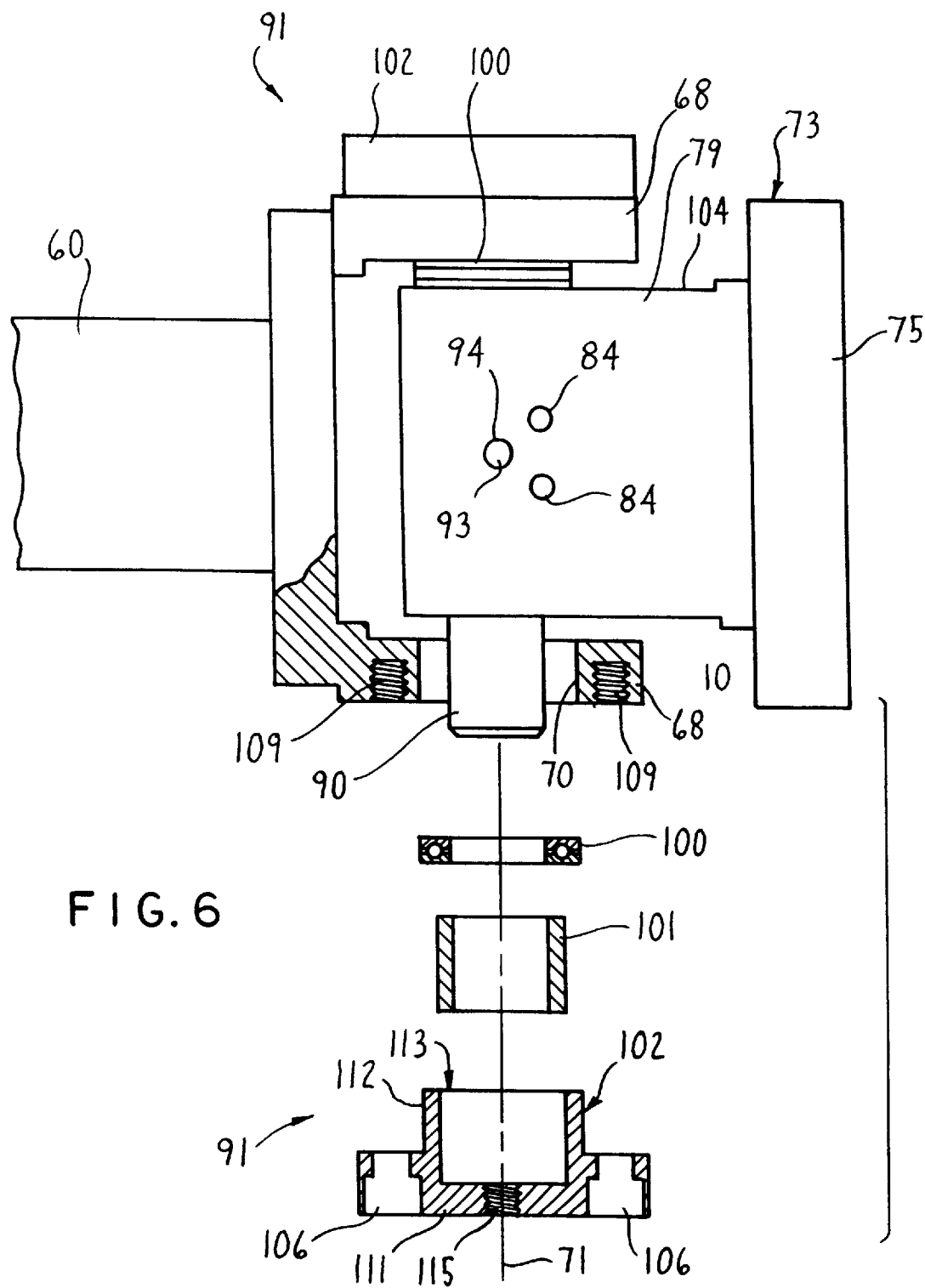
FIG. 6 is an exploded enlarged plan view of one end of the arm assembly in partial cross-section.
Figure 7:
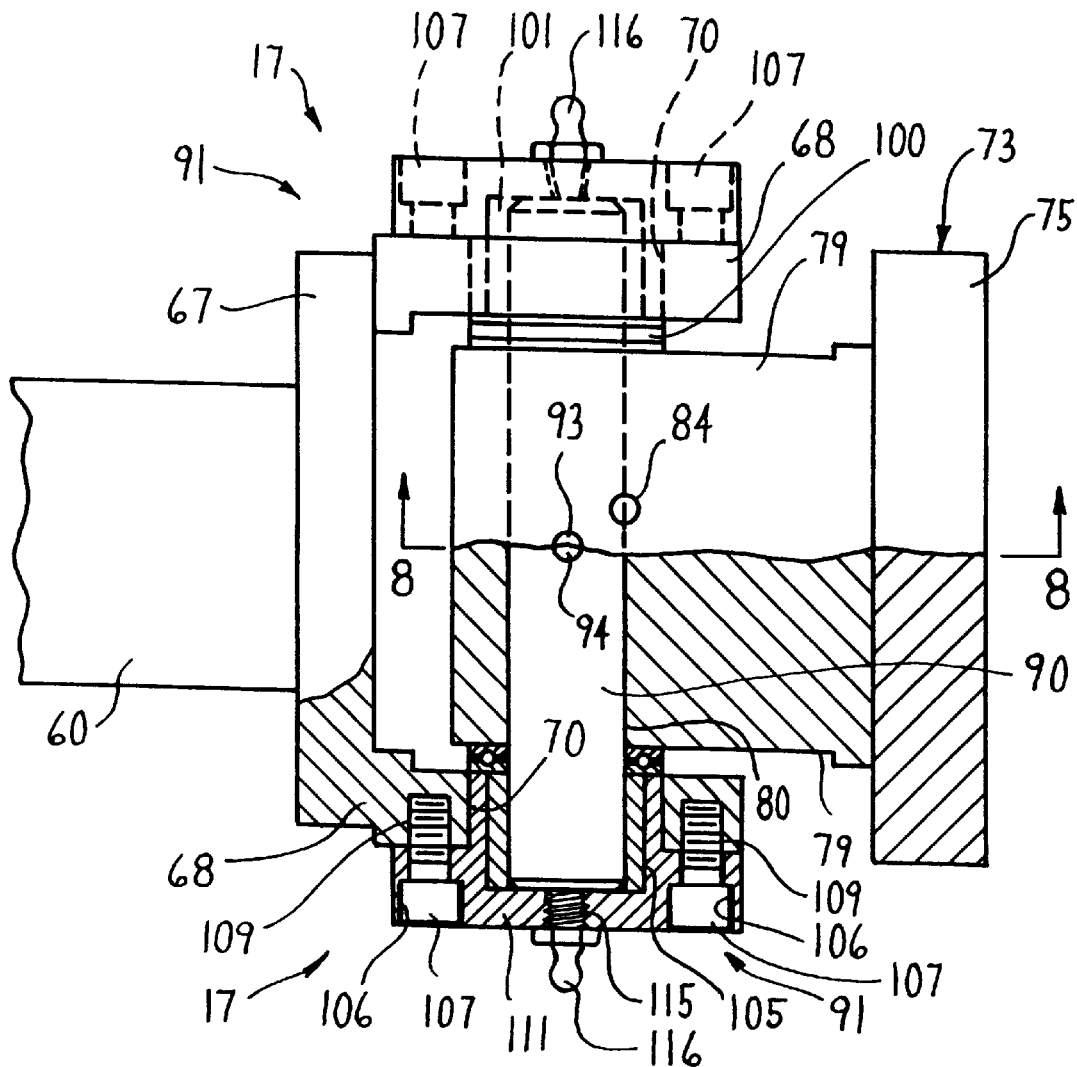
FIG. 7 is a plan view in partial cross-section of the arm assembly of FIG. 6 which is assembled together.

The inner face of the bracket plate 75 is formed with a pair of pivot supports 79 that are formed identical to the pivot supports 57 on the inner support bracket 45. The pivot supports 79 are vertically spaced apart and have a significant vertical thickness which is proximate the vertical thickness of the support flanges 68 on the yoke 67. As seen in FIGS. 6 and 7, each pivot support 79 is formed with a horizontal bore 80 which extends horizontally therethrough and is formed the same as the bores 61 in the pivot supports 57.

More particularly, each bore 80 includes opposite open ends which open horizontally from the pivot supports 79, and has a diameter which is less than the diameter of the flange bores 70 which are formed in the support flanges 68. Each pivot support 79 also includes a locking bore 83 which extends almost entirely through the vertical thickness thereof and centrally through the bore 80. Each pivot support 79 also includes a pair of screw holes 84 which are disposed proximate the locking bore 83. Locking bore 83 and screw holes 84 are formed the same as the locking bore 62 and screw holes 63 referenced previously.

To connect the load support bracket 73 to the upper and lower arms 60-1 and 60-2, each horizontal bore 80 is adapted to receive a pivot pin 90 horizontally therethrough. The pivot pin 90 preferably is formed from a hardened metal.

Generally, the pivot pin 90 includes a pair of bearing assemblies 91 which are disposed at the opposite ends thereof wherein the cooperation of the pivot pin 90 and the bearing assemblies 91 effectively defines the pivot connections 17 between each support flange 68 and pivot supports 79. Similar pivot connections 17 are also defined between each support flange 68 and the pivot supports 57 of the inner support bracket 45.

Figure 8:
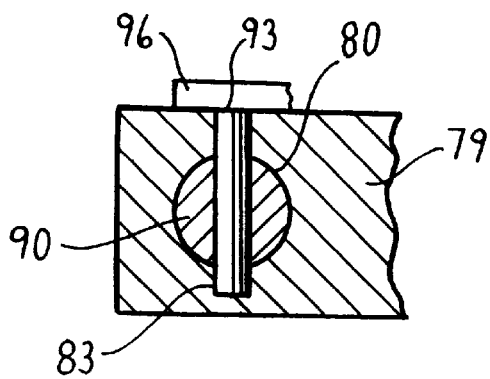
FIG. 8 is a side cross-sectional view of the connection between the arm assembly and a support bracket taken along line 8—8 of FIG. 7.

When the yokes 67 are positioned adjacent to the pivot support as illustrated in FIG. 6, the pivot pin 90 is slidable sidewardly into the bore 80 at the one end of the arm assembly 14 or into the bore 61 at the opposite end thereof. The pivot pin 90 has a diameter which is proximate but slightly smaller than the diameter of the bore 80 such that the pivot pin 90 is slidably inserted into the bore 80 with little relative movement being permitted therebetween. To prevent the pivot pin 90 from rotating inside the bore 80 or shifting axially therein, a locking pin 93 is slid vertically through the locking bore 83 and a further locking bore 94 formed in the pivot pin 90 as seen in FIG. 8. This prevents relative movement between the pivot pin 90 and the pin bore 80 and thus, substantially reduces wear between the pivot pin 90 and the interior surface of the bore 80.

To ease installation of the locking pin 93, the locking bore 94 alternatively is formed as a vertical slot formed offcenter on one side of the pivot pin 90. The slot opens vertically and sidewardly from the outer circumference of the pivot pin 90 such that the pivot pin material defines the three vertical side surfaces of this slot. In this arrangement, the locking bore 83 would also be shifted closer to the support column 12 relative to the position illustrated in FIG. 8 so as to be aligned with the slot.

Once the locking pin 93 is seated in place, a keeper 96 is secured either to the top of the upper pivot support 79 or to the bottom of the lower pivot support 79. The keeper 96 is a plate which overlies the opening of the locking bore 94, and is secured in place by suitable fasteners which engage the screw holes 84.

To pivotally support the arm 60, locking pin 93 has a longitudinal length which is greater than the width of the pivot supports 79 such that the opposite ends of the pivot pin 90 project through and out of the bores 70 formed in the support flanges 68. As illustrated in FIGS. 6 and 7, the bores 70 and 80 as well as the pivot pin 90 are arranged coaxially relative to the central axis 71. However, the pivot pin 90 has a diameter substantially smaller than the bore 70 so as to be disposed in radially spaced apart relation therewith. This spacing is provided to accommodate the bearing assemblies 91 at each opposite end of the pivot pin 90.

More particularly with respect to the bearing assemblies 91, each bearing assembly 91 is provided to define friction-reducing connections between the pivot pin 90 and the yoke 67. The bearing assembly 91 of the invention provides the distinct advantage of being readily removable or repairable without requiring disassembly or unloading of the load balancing mechanism 10.

In particular, each bearing assembly 91 comprises a thrust washer 100, a cylindrical bearing 101 and a bearing cap 102. The thrust washer 100 slides over the end of the pivot pin 90, through the flange bore 70. and abuts against the opposing side surface 104 of the pivot support 79. As discussed in greater detail herein, the thrust washer 100 is sandwiched between the side surface 104 of the pivot support 79 and an inner end of the bearing cap 102 to prevent sideward movement of the yoke 67 relative to the pivot supports 79 when the load balancing mechanism 10 is fully assembled. The thrust washer 100 thereby accommodates axial loads acting axially relative to the pivot pin 90.

To accommodate radial loads, the bearing 101 preferably is a cylindrical sleeve bearing wherein the bearing 101 fits onto the outer end of the pivot pin 90 and abuts axially against the outer side surface of the thrust washer 100. The outer circumferential surface 105 of the bearing 101, however, is spaced radially from the inner circumferential surface of the bore 70.

To prevent removal of the thrust washer 100 and bearing 101, the cap 102 fits over the bearing 101 and presses axially against the outermost surface of the thrust washer 100. The cap 102 includes screw holes 106, and the cap 102 is removably fastened to the outer surface of the support flanges 68 by suitable fasteners 107 which extend through the screw holes 106 in the cap 102 and into corresponding blind bores 109 in the support flange 68.

More particularly with respect to the bearing cap 102, the cap 102 includes an enlarged head 111 having a diameter which is greater than the bore 70 such that the head 111 lies against the outer surface of the support flange 68. The cap 102 further includes a cylindrical neck 112 which projects sidewardly from the interior face of the head 111. The neck 112 is formed with a bearing seat 113 that is defined by a blind bore which opens sidewardly and receives the bearing 101 in close fitting engagement therein. Preferably, the bearing 101 is manually pressed into the bearing seat 113 generally with a loose press fit. This loose press fit secures the bearing 101 and the cap 102 together while permitting ready removal of the bearing 101 manually by a user without requiring a machine therefor.

The cap 102 also includes a threaded grease port 115 in an end wall thereof which permits grease or other lubricants to be injected into the bearing seat 113. A threaded plug 116 threads into and encloses the grease port 15 during normal operation.

The bearing 101 is first fitted into the bearing seat 113, and then the cap 102 is fitted onto the pivot pin 90 and fastened to the yoke 67. When the bearing 101 is fitted into the bearing seat 113, the radial thickness of the bearing 101 and bearing seat 113 fills the radial space between opposing circumferential surfaces of the pivot pin 90 and the bore 70 such that radial loads on the pivot pin 90 are transferred radially to the support flange 68. The cap 102, however, can be removed from the yoke 67 and a bearing 101 can be removed from the cap 102 by simple manual manipulation thereof.

Since the pivot pin 90 remains stationary during pivoting of the yoke 67, the cap 102 also pivots with the yoke 67 and thus rotates relative to the pivot pin 90. The bearing 101, however, minimizes friction therebetween. During rotation of the individual arms 60 as the load 15 is raised and lowered by the cylinder assembly 16, the bearings 101 accommodate the radial loads while the thrust washer 100 accommodates axial loads along the pivot pin 90.

As a result the above-described arrangement, the pivot pins 90 are prevented from moving in the respective bores 61 and 80. Accordingly, motion and wear is contained in the area of the bearing assemblies 91 at the opposite ends of the pivot pins 90.

Still further, the bearing assemblies 91 also permit maintenance and replacement of the bearing assemblies 91 without requiring disassembly of the load bearing mechanism 10. In particular, each bearing assembly 91 is separate from the bearing assembly 91 at the opposite end of the pivot pin 90 and can be removed independently of the bearing assembly 91 at this opposite end.

Thus, as generally illustrated in FIG. 6, one bearing assembly 91 may be completely removed and disassembled such as for replacement of to the thrust washer 100 or the bearing 101, for example, due to wear. However, since a second bearing assembly 91 is provided at the opposite end of the pivot pin 90, the second bearing assembly 91 maintains a load-bearing connection between the support bracket 73 (or inner bracket 45) and the arms 60. Thus, even when one bearing assembly 91 is removed, a complete connection of all of the components is maintained, and disassembly of the load balancing mechanism 10 is not required when replacement of the bearing 101 is necessary. By providing removable bearings at the opposite ends of each pivot pin 90, a user can replace or work on the bearing assemblies 91 one at a time which leaves at least one bearing assembly in continuous engagement. As a result thereof, it is not necessary to remove the load 15 or other load handling equipment from the outer free end of the arm assembly 14. Rather, such a load 15 can be continually supported on the load support bracket 73. This significantly simplifies the process for performing maintenance on the load balancing mechanism.

It will be understood by the skilled artisan in view of the foregoing disclosure that additional modifications to the invention are possible. For example, while the thrust washer 100 and bearing 101 are disclosed as separate components, alternative bearing constructions may be provided which accommodate both axial and radial loads in a single bearing which is fitted into the bearing cap 102.

Besides providing a pair of bearing assemblies 91 at each end of the arms 60, a pair of bearing assemblies 91 also are used to define the pivot connections between the cylinder assembly 16 and the cylinder connector flange 72. More particularly, the cylinder assembly 16 is a conventional unit comprising a clamp bracket 117 which clamps to the support column 12 in the same manner as the clamps on the inner support bracket 45. The clamp bracket 117 also includes a pivot support 119, wherein a pressure cylinder 120 is pivotally connected to the pivot flange 119. In particular, the pressure cylinder 120 includes a pivot bracket 121 which is pivotally connected to the pivot flange by a pivot pin 122. If desired, the pivot pin 122 may have bearing assemblies 91 at the opposite ends thereof which provides for ready replacement of the bearings.

Pressure cylinder 120 further includes an extendible cylinder rod 125 which can be extended and retracted in a conventional manner. The lower end of the cylinder rod 125 includes a U-shaped yoke 127 having a pivot pin which is engaged with the cylinder connector flange 72 by a pair of bearing assemblies 91 at the opposite ends of the pivot pin. In particular, the bearing assembly 91 is illustrated with the bearing cap 102 being connected to the yoke 127 by a pair of fasteners 107. Since two bearing assemblies 91 are provided, one of these bearing assemblies 91 can be removed while the remaining bearing assembly 91 remains in load-bearing engagement between the arm assembly 14 and the cylinder assembly 16.

In operation, the arms 60-1 or 60-2 are connected to the inner support bracket 45 or the load support bracket 73 by first aligning the flange bores 70 with a corresponding one of the pin bores 61 or 80. A pivot pin 90 is then inserted horizontally therethrough into the corresponding pin bore 61 or 80. The pivot pin 90 is secured in place by insertion of a locking pin 93 through one of the locking bores 62 or 83 into the locking bore 94 of the pivot pin 90. The locking pin 93 is secured in place by the keeper 96 which arrangement thereby prevents relative movement between the pivot pin 90 and the corresponding pin bore 61 or 80.

Thereafter, a bearing assembly 91 is mounted in place on each opposite end of the pivot pin 90. More particularly, the bearing 101 is inserted into the bearing seat 113 on the bearing cap 102. The bearing assembly 91 is installed by placing the thrust washer 100 onto the end of the pivot pin 90 and then sliding the thrust washer 100 axially through the flange bore 70 into abutting engagement with the side surface 104 of the pivot support 57 or 79. The bearing cap 102 is then manually slid onto the corresponding end of the pivot pin 90 wherein the end of the pivot pin 90 is inserted into the central opening of the bearing 101. The assembly of the cap 102 and the bearing 101 is inserted into the radial spaced defined between the pivot pin 90 and the flange bore 70 to accommodate radial loads.

The bearing cap 102 is removably secured to the support flange 68 by the fasteners 107. These fasteners 107 or other suitable connectors prevent removal of the bearing assembly 91 wherein the bearing assemblies 91 at the opposite ends of the pivot pin 90 effectively trap the pivot pin 90 between a corresponding pair of the bearing caps 102 which bearing caps 102 themselves are secured to the support flanges 68 and prevent sideward movement of the arms 60 relative to the support bracket 45 or 73.

While two bearing assemblies 91 are provided on each pivot pin 90, each bearing assembly 91 is independently removable and is able to independently maintain a load-bearing connection between the arms 60 and the support bracket 45 or 73.

In the event that it is necessary to remove a bearing assembly 91 such as for maintenance, one bearing assembly 91 may be removed independently of the other associated bearing assembly 91 which maintains the load-bearing connection. Upon removal, the bearing assembly 91 can be repaired or replaced and then reinstalled. This arrangement of bearing assemblies 91 permits removal of the bearing assemblies 91 one after the other and does not require disassembly or unloading of the load balancing mechanism 10.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A support arm arrangement for balancing loads comprising:

a support;

an arm assembly which is pivotally connected to said support to support loads thereon, said arm assembly comprising an inner bracket fixedly connected to said support, an outer bracket which is adapted to support a load thereon and an arm extending between said inner bracket and said outer bracket, opposite ends of said arm being pivotally connected to said inner bracket and said outer bracket respectively to permit pivoting of said arm assembly in a vertical plane, each of said inner bracket and said outer bracket including at least one support section and first and second pin sections which project horizontally from said support section, said first and second pin sections being coaxially aligned to define a horizontal pivot axis about which said arm pivots, each of said opposite ends of said arm including horizontally spaced apart support flanges which project toward said pin sections, each of said pin sections being pivotally connected to a corresponding one of said support flanges by a bearing unit wherein said bearing unit permits relative movement between said pin section and said corresponding support flange, each of said bearing units defining a load bearing connection between said first pin section and said corresponding support flange during removal of another said bearing unit from said coaxially aligned second pin section; and a load balancing mechanism connected between said support and said arm for balancing the load being carried on said arm assembly.

2. The support arm arrangement according to claim 1, wherein each of said bearing units comprise a bearing cap which defines a bearing seat, and a bearing secured to said bearing seat.

3. The support arm arrangement according to claim 2, wherein said bearing cap includes connector means for removably connecting said bearing cap to said arm assembly.

4. The support arm arrangement according to claim 3, wherein said bearing unit is connected to said arm assembly solely by said connector means.

5. The support arm arrangement according to claim 3, wherein said connector means comprise threaded fasteners which secure said bearing cap to said support flange corresponding thereto.

6. The support arm arrangement according to claim 1, each of said support sections defines a horizontally elongate pin bore, and said first and second pin sections are defined by opposite ends of a horizontally elongate pin, said horizontally elongate pin being disposed within said pin bore and being non-movably connected to said support section.

7. The support arm arrangement according to claim 1, wherein at least two of said arms are provided, each of said inner bracket and said outer bracket including at least two of said support sections wherein one of said support sections pivotally supports one of said arms and another of said support sections pivotally supports another of said arms.

8. A support arm arrangement for balancing loads comprising:

a support;

an arm assembly which is pivotally connected to said support to support loads thereon, said arm assembly comprising an inner bracket fixedly connected to said support, an outer bracket which is adapted to support a load thereon and at least two parallel arms extending between said inner bracket and said outer bracket, each of said inner bracket and said outer bracket including a vertically spaced apart pair of support sections, each of said support sections including first and second pin sections which project horizontally from said support section on opposite sides thereof, said first and second pin sections being pivotally connected to a corresponding one of said arms and being coaxially aligned to define a horizontal pivot axis about which said corresponding arm pivots in a vertical plane, opposite ends of said arms being pivotally connected to said inner bracket and said outer bracket respectively wherein each of said opposite ends includes horizontally spaced apart support flanges which project toward said first and second pin sections, each of said pin sections being pivotally connected to a corresponding one of said support flanges by a bearing unit wherein said corresponding support flange includes a flange bore through which said corresponding pin section extends coaxially, each of said bearing units permitting relative movement between said pin section and said support flange corresponding thereto while preventing radial and axial movement of said support flange relative to said pin section; and a load balancing mechanism connected between said support and said arm assembly for balancing the load being carried thereon.

9. The support arm arrangement according to claim 8, wherein a radial space is defined between an outer surface of said pin section and an inner surface of said flange bore corresponding thereto, said bearing unit extending radially between said inner and outer surfaces.

10. The support arm arrangement according to claim 8, wherein said bearing unit is secured to said arm assembly solely by removable connectors.

11. The support arm arrangement according to claim 10, wherein said bearing unit on said first pin section is removable while said bearing unit on said coaxial second pin section defines a load bearing connection between said second pin section and said support flange corresponding thereto.

12. The support arm arrangement according to claim 8, wherein each of said bearing units includes a head which is larger than said flange bore and abuts against an opposing surface of said support flange, each said bearing unit further including connectors which are removably connected between said head and said support flange.

13. The support arm arrangement according to claim 12, wherein each of said bearing units includes a bearing which is supported on said head and is insertable into a radial space defined between an outer surface of said pin section and an inner surface of said support flange corresponding thereto.

14. The support arm arrangement according to claim 13, wherein each of said bearing units further includes a thrust washer disposed axially between opposing surfaces of said support section and said support flange to maintain said opposing surfaces in spaced apart relation.

15. A support arm arrangement for balancing loads comprising:
   a support;
   an arm assembly which is pivotally connected to said support to support loads thereon, said arm assembly comprising an inner bracket fixedly connected to said support, an outer bracket which is adapted to support a load thereon and an arm extending between said inner bracket and said outer bracket, opposite ends of said arm being pivotally connected to said inner bracket and said outer bracket respectively to permit pivoting of said arm assembly in a vertical plane, each of said inner bracket and said outer bracket including at least one support section and first and second pin sections which project horizontally from said support section, said first and second pin sections being coaxially aligned to define a horizontal pivot axis about which said arm pivots in said vertical plane, each of said opposite ends of said arm including horizontally spaced apart support flanges which project toward said first and second pin sections, each of said pin sections being pivotally connected to a corresponding one of said support flanges by a bearing unit wherein said bearing unit permits relative movement between said pin section and said support flange corresponding thereto, said bearing unit including connectors which connect each of said bearing units to a corresponding one of said support flanges wherein said bearing units are connected to said corresponding support flanges solely by said connectors, said connectors being removable to permit removal of said bearing units; and
   a load balancing mechanism connected between said support and said arm for balancing the load being carried on said arm assembly.

16. The support arm according to claim 15, wherein each of said bearing units comprises a bearing cap that defines a bearing seat and a bearing which is removably connected to said bearing seat.

17. The support arm according to claim 16, wherein said bearing cap includes a bore which defines said bearing seat, said bearing being slidably fitted into an open end of said bore, said bearing defining a bearing opening which opens axially so as to slidably receive a corresponding one of said pin sections therein.

18. The support arm according to claim 16, wherein each of said bearing units further comprises a thrust washer disposed axially between opposing surfaces of said bearing unit and said support section such that the connection between said bearing unit and said support flange prevents relative axial movement between said pin section and said support flange.

19. The support arm according to claim 18, wherein said first and second pin sections are defined by opposite ends of a horizontally elongate pivot pin which is supported by said support section, each of said opposite ends of said pivot pin having one of said bearing units connected thereto, each of said bearing units being removable while the other of said bearing units of the opposite end of said pivot pin maintains the load bearing connection between said pivot pin and said arm.

20. The support arm according to claim 19, wherein a locking member is provided between said support section and said pivot pin to prevent relative movement therebetween, said connectors being connected between said bearing units and said flanges on said arm such that said bearing moves relative to said pivot pin during pivoting of said arm.

21. A support arm arrangement for supporting loads comprising:
   a support column;
   an arm assembly which is pivotally connected to said support column to support loads thereon, said arm assembly comprising an inner bracket on said support column, an outer bracket which is adapted to support loads thereon and at least one elongate arm which has opposite ends connected to said inner bracket and said outer bracket respectively to permit vertical pivoting of said arm assembly, one of said inner bracket and said arm including at least one support section and first and second pin sections which project horizontally from said support section and define a horizontal pivot axis about which said arm pivots, the other of said inner bracket and said arm including support flanges pivotally connected to said first and second pin sections by bearing units which define load bearing connections therebetween, said load bearing connection between said first pin section and said corresponding support flange supporting said arm during removal of another of said bearing units from said second pin section; and
   a load balancing mechanism connected between said support column and said arm assembly which supports the load being carried on said arm assembly while permitting pivoting of said arm about said horizontal pivot axis.

22. The support arm arrangement according to claim 21, wherein a radial space is defined between each of said first and second pin sections and said support flanges corresponding thereto, said bearing units being disposed within said radial spaces.

23. The support arm arrangement according to claim 22, wherein said support section supports an elongate pin, said pin having opposite ends which define said first and second pin sections.

24. The support arm arrangement according to claim 21, wherein at least two of said arms are provided.

25. A support arm arrangement for supporting loads comprising:
   a support column;
   an arm assembly which is pivotally connected to said support column to support loads thereon, said arm assembly comprising an inner connector bracket which is fixedly connected to said support column, an outer connector bracket which is adapted to support loads thereon and at least one elongate arm which has opposite end sections connected to said inner connector bracket and said outer connector bracket respectively;
   a load supporting mechanism connected between said support and said arm assembly which supports the load being carried on said arm assembly while permitting vertical pivoting of said arm, said load supporting mechanism including a mechanism connector bracket which connects said load supporting mechanism to said arm; and said arm arrangement including a plurality of pivot connections defined between said arm and a respective plurality of said connector brackets, each of said pivot connections including at least two aligned bearing units removably connected between said arm and said respective connector bracket wherein said aligned bearing units define a horizontal pivot axis to permit relative pivoting movement between said arm and said respective connector bracket, each of said aligned bearing units in a pivot connection defining a load bearing connection between said arm and said respective connector bracket such that one of said aligned bearing units supports said arm during removal of another of said aligned bearing units.

26. The support arm arrangement according to claim 25, wherein a first one of said pivot connections is defined between said arm and said inner connector bracket and a second one of said pivot connections is defined between said arm and said mechanism connector bracket.

27. The support arm arrangement according to claim 26, wherein a third one of said pivot connections is defined between said arm and said outer connector bracket.

28. The support arm arrangement according to claim 27, wherein said arm arrangement includes an other arm which is connected to said inner and outer connector brackets in a parallelogram arrangement, fourth and fifth ones of said pivot connections being defined between said other arm and said inner and outer connector brackets respectively.

* * * * *